(12) United States Patent
Rusek (10) Patent No.: US 11,990,959 B2
(45) Date of Patent: May 21, 2024

(54) TIME-OVERLAPPING BEAM-SWEPT TRANSMISSIONS

(71) Applicant: Sony Corporation, Tokyo (JP)

(72) Inventor: Fredrik Rusek, Eslöv (SE)

(73) Assignee: Sony Group Corporation, Tokyo (JP)

( * ) Notice: Subject to any disclaimer, the term of this patent is extended or adjusted under 35 U.S.C. 154(b) by 636 days.

(21) Appl. No.: 17/259,183

(22) PCT Filed: Jul. 8, 2019

(86) PCT No.: PCT/EP2019/068248
§ 371 (c)(1),
(2) Date: Jan. 10, 2021

(87) PCT Pub. No.: WO2020/011708
PCT Pub. Date: Jan. 16, 2020

(65) Prior Publication Data
US 2021/0273701 A1 Sep. 2, 2021

(30) Foreign Application Priority Data

Jul. 13, 2018 (SE) .................................. 1830219-0

(51) Int. Cl.
*H04B 7/06* (2006.01)
*H04L 5/00* (2006.01)

(52) U.S. Cl.
CPC ......... *H04B 7/0617* (2013.01); *H04L 5/0048* (2013.01)

(58) Field of Classification Search
CPC ............................ H04B 7/0617; H04L 5/0048
See application file for complete search history.

(56) References Cited

U.S. PATENT DOCUMENTS

2009/0247156 A1* 10/2009 Sampath ......... H04W 36/00835
  455/434
2013/0315211 A1* 11/2013 Balan .................... H04L 27/266
  370/336

(Continued)

FOREIGN PATENT DOCUMENTS

| CN | 107113268 A | 8/2017 |
| CN | 107852705 A | 3/2018 |
| WO | WO-2018127558 A1 | 7/2018 |

OTHER PUBLICATIONS

International Search Report and Written Opinion from corresponding International Application No. PCT/EP2019/068248, mailed on Oct. 14, 2019, 9 pages.

(Continued)

*Primary Examiner* — Jael M Ulysse
(74) *Attorney, Agent, or Firm* — Tucker Ellis LLP (57) ABSTRACT time A method of operating a wireless communication device (101, 102) includes participating in beam-swept transmissions (311-313) of at least one symbol (361-363) on a wireless link (111) between the wireless communication device (101, 102) and a further wireless communication device (101, 102) along multiple beams (501-503), each symbol (361-363) of the at least one symbol including at least one reference signal (152, 391-393). The beam-swept transmissions (311-313) are at least partly overlapping in frequency and time and have a time offset (381) from each other that is smaller than a guard interval duration (356) associated with the at least one symbol (361-363).

11 Claims, 9 Drawing Sheets

(56) References Cited

U.S. PATENT DOCUMENTS

| | | | | |
|---|---|---|---|---|
| 2013/0315321 | A1* | 11/2013 | Rajagopal | H04B 7/0695 375/260 |
| 2014/0314167 | A1* | 10/2014 | Jeong | H04B 7/0617 375/267 |
| 2017/0302419 | A1* | 10/2017 | Liu | H04L 5/0078 |
| 2017/0311276 | A1* | 10/2017 | Tsai | H04L 27/2655 |
| 2017/0331670 | A1* | 11/2017 | Parkvall | H04B 7/0617 |
| 2018/0034515 | A1* | 2/2018 | Guo | H04B 7/0404 |
| 2018/0167946 | A1* | 6/2018 | Si | H04W 72/30 |
| 2018/0248642 | A1* | 8/2018 | Si | H04L 5/0092 |
| 2018/0262313 | A1* | 9/2018 | Nam | H04L 5/0044 |
| 2018/0310283 | A1* | 10/2018 | Deenoo | H04W 72/23 |
| 2019/0058558 | A1* | 2/2019 | Lee | H04L 27/265 |
| 2019/0097772 | A1* | 3/2019 | Yang | H04B 7/0695 |
| 2019/0253866 | A1* | 8/2019 | Abedini | H04B 7/088 |
| 2019/0349180 | A1* | 11/2019 | Lu | H04L 27/2607 |
| 2020/0037385 | A1* | 1/2020 | Park | H04W 56/001 |
| 2020/0092871 | A1* | 3/2020 | Axnäs | H04W 74/0891 |
| 2020/0145079 | A1* | 5/2020 | Marinier | H04W 56/0045 |
| 2020/0266874 | A1* | 8/2020 | Thurfjell | H04B 17/364 |
| 2020/0288479 | A1* | 9/2020 | Xi | H04L 5/0051 |
| 2020/0383089 | A1* | 12/2020 | Goto | H04L 1/1822 |
| 2021/0028984 | A1* | 1/2021 | Da Silva | H04W 56/001 |
| 2021/0045141 | A1* | 2/2021 | Lee | H04L 5/0053 |
| 2021/0226682 | A1* | 7/2021 | Park | H04L 5/005 |

OTHER PUBLICATIONS

Dammann, Armin et al., "Beamforming in Combination with Space-Time Diversity for Broadband OFDM Systems", Proceedings of IEEE International Conference on Communications, vol. 1, dated Apr. 28, 2002, pp. 165-171.

* cited by examiner

FIG. 4
(reference implementation)

TIME-OVERLAPPING BEAM-SWEPT TRANSMISSIONS

TECHNICAL FIELD

Various examples of the invention general relate to beam-swept transmissions for sounding of propagation channels of a wireless link. Various examples specifically relate to at beam-swept transmissions that at least partially overlap in time domain.

BACKGROUND

Wireless beamformed transmission is becoming increasingly popular. One advantage of beamforming is the ability to transmit on high carrier frequencies by increasing antenna aperture, e.g., above 6 GHz and even up to 60 GHz or beyond. Large bandwidths may be achieved. Another advantage of beamforming is the availability of spatial multiplexing, thereby increasing spectral efficiency. The overall antenna efficiency can be increased.

Various applications of beamforming are envisioned in the Third Generation Partnership Project (3GPP) New Radio (NR) or 5G communication networks. Within the scope of 3GPP NR, the devices—such as terminals/user equipment devices (UEs) and base stations (BS)—shall be able to communicate with significantly higher radio frequencies than the existing 3GPP standards such as Wideband Code Division Multiple Access (WDCMA) and Long Term Evolution (LTE). Examples of such higher frequencies are within 20-40 GHz, in addition to the communication bandwidths around 1-2 GHz that are specified for the legacy 3GPP standards.

For beamforming, a wireless interface typically is typically coupled to an antenna panel. The antenna panel includes an array of antenna elements. The antenna panel can implement a beamformed transmission. The phase-coherent superposition of transmitting and/or receiving (communicating) using a plurality of antenna elements is referred to as a beamformed transmission. The beamformed transmission creates transmission directivity. Here, the gain in a certain direction is often several dBs higher than the gain from a single antenna element (beamforming gain).

The amplitude and phase relationship between the different antenna elements are specified by the specific values of antenna weights, where each value of the antenna weights is indicative of the amplitude and phase of a given antenna element of an antenna panel. Different values of the antenna weights are associated with different beams of the beamformed transmission; beams may differ in terms of direction, beam width, etc.

A beamformed transmission may generally be employed for receiving signals (receive beamforming) and/or for transmitting signals (transmit beamforming). Receive beamforming uses a receive beam. Transmit beamforming uses a transmit beam. A beamformed transmission may be implemented in uplink (UL) direction and/or in downlink (DL) direction and/or in sidelink direction.

According to reference implementations, typically beam-swept transmissions (sometimes labelled a beamsweep) along multiple beams are employed to determine the values of the antenna weights, i.e., in order to determine the appropriate beam for a data transmission. Specifically, the appropriate orientation of the beam to be used has to be determined. In a beam-swept transmission, one or more reference signals (sometimes also referred to as pilot signals) are transmitted. Based on a receive property of the reference signal, it is then possible to identify the appropriate beam.

It has been observed that beam-swept transmissions can create significant control signaling overhead. For example, the transmissions on different beams may be time multiplexed; thus, the time required to complete the multiple beam-swept transmissions can be long. On the other hand, it is not always possible to reduce the count of beams of the beam-swept transmissions: otherwise performance degradation can occur, because a suitable beam may not be easily identified.

SUMMARY

Therefore, a need exists for advanced techniques of beamforming. Specifically, a need exists for advanced techniques of a performing beam-swept transmissions along multiple beams.

A method of operating a wireless communication device includes participating in beam-swept transmissions of at least one symbol on a wireless link. The wireless link is between the wireless communication device and the further wireless communication device. The beam-swept transmissions are along multiple beams. Each symbol of the at least one symbol includes at least one reference signal. The beam-swept transmissions are at least partly overlapping in frequency and time. The beam-swept transmissions have a time offset from each other that is smaller than a guard interval duration associated with the plurality of symbols.

A wireless communication device includes a control circuitry that is configured to participate in beam-swept transmissions of at least one symbol on a wireless link. The wireless link is between the wireless communication device and the further wireless communication device. The beam-swept transmissions are along multiple beams. Each symbol of the at least one symbol includes at least one reference signal. The beam-swept transmissions are at least partly overlapping in frequency and time. The beam-swept transmissions have a time offset from each other that is smaller than a guard interval duration associated with the plurality of symbols.

It is to be understood that the features mentioned above and those yet to be explained below may be used not only in the respective combinations indicated, but also in other combinations or in isolation without departing from the scope of the invention.

DETAILED DESCRIPTION OF EMBODIMENTS

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques of wireless communication using a wireless communication system are described. The wireless communication system includes multiple wireless communication devices, communicating via a wireless link. In some examples, the wireless communication system may be implemented by a communication network. For example, the communication network may be a cellular network including multiple cells, wherein each cell is defined by one or more BSs. Examples include the 3GPP LTE and the 3GPP NR communication networks. Furthermore, respective techniques may be readily applied to various kinds of non-3GPP-specified architectures, such as Bluetooth, satellite communication, IEEE 802.11x Wi-Fi technology, etc.

Hereinafter, techniques of communicating between a UE and a BS are described. As a general rule, similar techniques may also be applied for communicating between other kinds of wireless communication devices, e.g., in a peer-to-peer communication of a wireless communication system, e.g., using Bluetooth, or on a sidelink channel, etc.

For sake of simplicity, the direction of communicating from the BS to the UE is labeled DL direction; and the direction of communicating from the UE to the BS is labeled UL direction. As a general rule, various example techniques described herein for DL transmission may be equally applied to UL transmission; and vice versa. Also, sidelink communication or peer-to-peer communication is possible.

The techniques described herein may facilitate determining beams used for a beamformed transmission of data—e.g., payload data such as application data or control data such as Layer 2 or Layer 3 control data. The techniques described herein may facilitate sounding multiple propagation channels of a wireless link. For this, reference signals may be employed, in multiple beamformed transmissions. The multiple beamformed transmissions that are along multiple beams having a well-defined arrangement with respect to each other can be simply referred to as beam-swept transmissions. Then, a quality measure may be associated with each propagation channel, that is defined by a respective beam.

A beam may generally define a directivity of the respective beamformed transmission. The spatial profile of the beam may define a certain opening angle and amplitude of the beam. The spatial profile may define side lobes which may be suppressed if compared to a central peak of the beam. The beam may be associated with a propagation channel of the respective signals; here, the propagation channel may include one or more reflections, or may be a line-of-sight (LOS) propagation channel, etc.

The techniques described herein may generally facilitate efficient beamforming and/or spatial diversity. Facilitating beamforming may, in turn, facilitate spatial multiplexing and high frequencies, e.g., above 6 GHz or 10 GHz or even above 50 GHz. The bandwidth can be in the range of 100 MHz and 1 GHz. Specifically, according to various examples described herein, the respective values of the antenna weights can be efficiently and accurately determined. For example, control overhead required for determining beams can be reduced if compared to reference scenarios. The latency of determining beams can be reduced. At the same time, the appropriate beam may be identified at high accuracy. Also, a complexity of the techniques described herein is low, providing for resource-efficient implementation.

According to various examples, this is achieved by participating in beam-swept transmissions of at least one symbol on the wireless link. The beam-swept transmissions are along multiple beams, as explained above. To facilitate sounding of the associated propagation channels, each symbol includes at least one reference signal. As a general rule, different reference signals/symbols may or may not be transmitted and/or received along different beams.

The beam-swept transmissions are at least partly overlapping in frequency domain and time domain. The beam-swept transmission have a time offset from each other. The time offset is smaller than a guard interval duration associated with the plurality of symbols.

The time overlap helps to reduce a total time required for completing the beam-swept transmissions. At the same time, the time overlap is dimensioned with respect to the guard interval such that separation of the beam-swept transmissions is possible at the receiver, even in view of delay spread of the wireless link.

Figure 1:
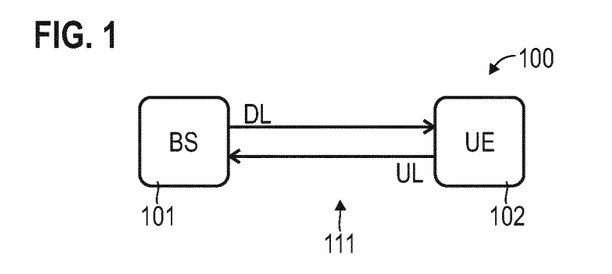
FIG. 1 schematically illustrates a wireless communication system including two wireless communication devices according to various examples.

FIG. 1 schematically illustrates aspects with respect to a wireless communication system 100 that may benefit from the techniques disclosed herein. The wireless communication system 100, in the example of FIG. 1, is implemented by a communication network including a BS 101 to which a UE 102 is connectable. The network be implemented by a 3GPP-standardized network such as 4G LTE or upcoming 5G NR. Further examples include 3GPP NB-IOT or eMTC networks. Other examples include point-to-point networks such as Institute of Electrical and Electronics Engineers (IEEE)-specified networks, e.g., the 802.11x Wi-Fi protocol or the Bluetooth protocol.

A wireless link 111 is established between the BS 101 and the UE 102. The wireless link 111 includes a DL wireless link from the BS 101 to the UE 102; and further includes an UL wireless link from the UE 102 to the BS 101. The wireless link 111 may occupy frequencies above 6 GHz.

The UE 102 may be one of the following: a smartphone; a cellular phone; a tablet; a notebook; a computer; a smart TV; an MTC device; an eMTC device; an IoT device; an NB-IoT device; a sensor; an actuator; etc.

Figure 2:
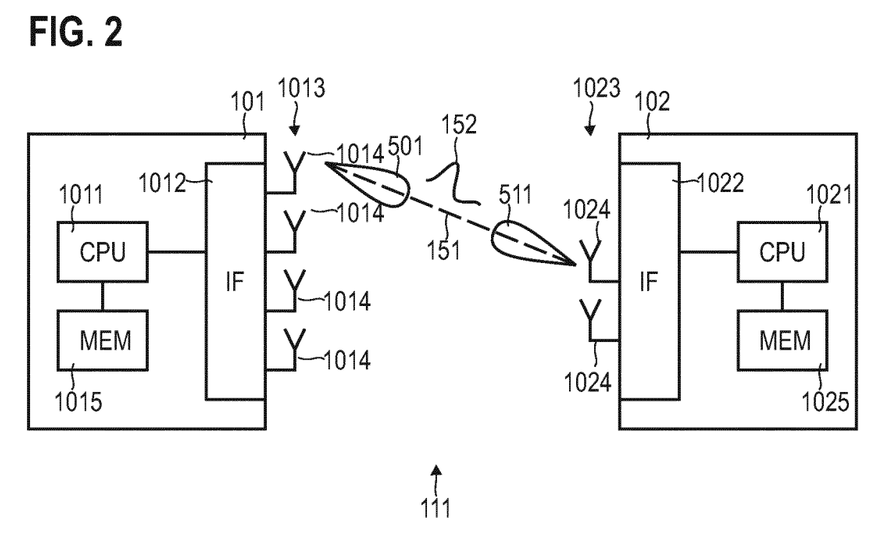
FIG. 2 schematically illustrates the wireless communication system of FIG. 1 in further detail.

FIG. 2 schematically illustrates the BS 101 and the UE 102 in greater detail. The BS 101 includes a processor 1011 and a wireless interface 1012. The wireless interface 1012 is coupled via antenna ports (not shown in FIG. 2) with an antenna panel 1013 including a plurality of antennas 1014. In some examples, the antenna panel 1013 may include at least 30 antennas 1014, optionally at least 110 antennas, further optionally at least 200 antennas. Each antenna 1014 may include one or more electrical traces to carry a radio frequency current. Each antenna 1014 may include one or more LC-oscillators implemented by the electrical traces. Each trace may radiate electromagnetic waves with a certain beam pattern. In some examples the BS 101 may include multiple antenna panels.

The BS 101 further includes a memory 1015, e.g., a non-volatile memory. The memory may store program code that can be executed by the processor 1011. Thus, the processor 1011 and the memory 1015 form a control circuit.

Executing the program code may cause the processor 1011 to perform techniques with respect to: participating in beam-swept transmissions (i.e., beamsweeping) by transmitting or receiving, participating in a beamformed transmission by transmitting or receiving, etc.

The UE 102 includes a processor 1021 and a wireless interface 1022. The wireless interface 1022 is coupled via antenna ports (not shown in FIG. 2) with an antenna panel 1023 including a plurality of antennas 1024. In some examples, the antenna panel 1023 may include at least 6 antennas, optionally at least 16 antennas, further optionally at least 32 antennas. Generally, the antenna panel 1023 of the UE 102 may include fewer antennas 1024 than the antenna panel 1013 of the BS 101. Each antenna 1024 may include one or more electrical traces to carry a radio frequency current. Each antenna 1024 may include one or more LC-oscillators implemented by the electrical traces. Each trace may radiate electromagnetic waves with a certain beam pattern. Also the UE 102 may include multiple antenna panels 1023.

The UE 102 further includes a memory 1025, e.g., a non-volatile memory. The memory 1025 may store program code that can be executed by the processor 1021. Thus, the processor 1021 and the memory 1025 form a control circuit. Executing the program code may cause the processor 1021 to perform techniques with respect to: participating in beam-swept transmissions (i.e., beamsweeping) by transmitting or receiving, participating in a beamformed transmission by transmitting or receiving, etc.

FIG. 2 also illustrates aspects with respect to propagation channels 151 (hereinafter, briefly referred to as channels). FIG. 2 schematically illustrates that different channels 151 (dashed lines in FIG. 2) are implemented on the wireless link 111. The different channels 151 are associated with different beams 501, 511 (in FIG. 2, for sake of simplicity, only a single beam 511 implemented by the UE 102 and a single beam 501 implemented by the BS 101 are illustrated). For example, to implement a certain channel 151 for DL communication, a certain DL transmit beam may be selected for the transmission from the BS 101 to the UE 102.

As a general rule, a beam may be implemented by certain values of the antenna weights. Sometimes, the antenna weights are also referred to as steering vectors or precoding parameters. Accordingly, different beams 501, 511 may be addressed by using different amplitude and phase configurations for the various antennas 1014, 1024/antenna ports of the respective antenna panels 1013, 1023, i.e., different values for the antenna weights.

While in FIG. 2 LOS channels 151 are illustrated, in other examples, non-LOS channels 151 are possible. The amount of non-LOS channels 151 defines a richness of the channels. This may correlate with a delay spread of the respective channel. The delay spread can be proportional to a difference between the time of reception of the earliest significant multipath component (typically the LOS component) and the time of reception of the latest multipath components (typically a non-LOS component).

In FIG. 2, a scenario including reciprocity of the channel 151 is illustrated. In some scenarios, the path from the BS 101 to the UE 102 may be different from the path from the UE 102 to the BS 101.

Different ones of the channels 151 may have different transmission characteristics such as number of reflections, path loss, and generally transmission reliability and/or capacity. In particular, different channels 151 can have different fading profiles at the position of the respective receiver. Fading typically occurs due to destructive interference of reflected electromagnetic waves carrying the signals at the position of the receiver. Thus, the link performance will vary significantly depending on the selected beam 501, 511. This is referred to as beamforming gain. By using appropriate beams 501, 511—by determining the appropriate values for the antenna weights —, diversity can be provided to reduce fading.

According to various examples described herein, determining of the appropriate values for the antenna weights— and, hence, achieving a high beamforming gain—is facilitated using multiple beamformed transmissions that successively use different beams (beam-swept transmissions). To sound the wireless link 111 and, more specifically, the various channels 151, one or more reference signals 152 can be transmitted and received in the beam-swept transmissions.

Such reference signals 152 as described herein may generally have a well-defined waveform, symbol sequence, signal amplitude, and/or transmission power such that based on a receive property of the reference signals it is possible to sound the wireless link 111, i.e., specifically the respective channel 151 along which a reference signal 152 has been transmitted. Sometimes, the reference signals 152 may also be referred to as pilot signals. In certain scenarios, the reference signals may be indicative of the beam 501, 511 on which they are transmitted.

As a general rule, one or more reference signals 152 may be included in a symbol. Symbols may encode one or more signals according to a certain modulation. This is sometimes referred to as digital spectrum modulation. A symbol can correspond to a finite representation of information to be conveyed between ends of the wireless link 111. A waveform, i.e., the time evolution of a baseband representation of the symbol, may have a continuous amplitude. The waveform typically has well-defined frequency contributions in frequency domain. The waveform may generally relate to a representation of the shape of a wave that indicates its characteristics (such as frequency and amplitude). By sampling the waveform at the receiver at certain discrete sampling points, it is then possible to conclude back on one or more signals included in the symbol. For transmission of the symbol via the wireless link 111, the baseband representation of the symbol is combined with one or more carriers. A frequency of the one or more carriers is typically in the radio-frequency (RF) regime, i.e., larger than 1 or 2 GHz.

According to various examples, symbols using multiple carriers (then sometimes also labelled subcarriers) may be used. Generally, this may be referred to as frequency-division multiplexing. An example of such a technique is Orthogonal Frequency Division Multiplexing (OFDM). Here, multiple orthogonal subcarriers that are spaced in frequency domain encode different signals. For example, an inverse fast-Fourier transformation (IFFT) may be applied to various signals to obtain the waveform of the OFDM symbol. Different signals may be mapped to constellations of different modulation schemes. At the receiver, a fast-Fourier transform can be applied to reconstruct the various signals.

Typically, a symbol—such as an OFDM symbol—is associated with a guard interval (GI). A guard interval generally helps to separate multiple transmissions of symbols. GIs help to mitigate interference by avoid a temporal overlap between subsequent transmissions. Different transmissions may face different propagation delays, due to the delay spread. Hence, typically, the GI duration is set based on a delay spread expected for the transmissions on the wireless link 111.

An example implementation of a GI is a cyclic prefix (CP). The CP helps to reduce inter-symbol interference between multiple OFDM symbols that are subsequently transmitted.

Hereinafter, various techniques are described with respect to an example implementation of using OFDM symbols associated with CPs; but similar techniques may be readily applied using other types of symbols generally associated with GIs.

Various techniques are based on the finding that it can be possible to employ the CP associated with an OFDM symbol to implement at least partially time-overlapping beam-swept transmissions. Corresponding techniques are illustrated in FIG. 3.

Figure 3:
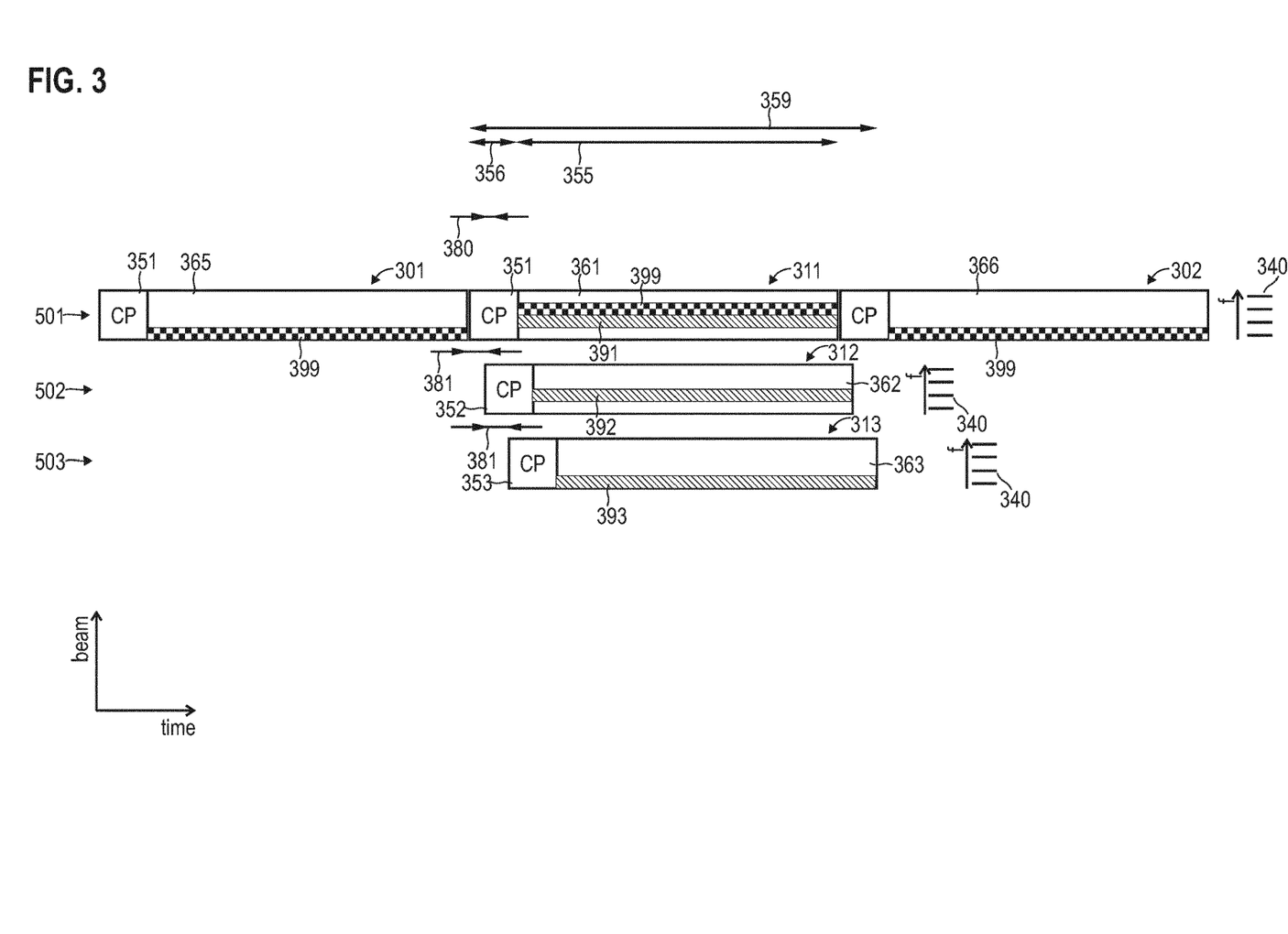
FIG. 3 schematically illustrates at multiple beam-swept transmissions that are at least partially overlapping in time domain and frequency domain according to various examples.

FIG. 3 illustrates aspects with respect to multiple beam-swept transmissions 311-313. For example, the transmission 311 relates to an OFDM symbol 361, the transmission 312 relates to an OFDM symbol 362, and the transmission 313 relates to an OFDM symbol 363. The transmission 311 is along a beam 501; the transmission 312 is along a beam 502; and the transmission 313 is along a beam 503.

As illustrated in FIG. 3, each OFDM symbol 361-363 extends over a certain time duration 355. Further, each OFDM symbol 361-363 is associated with the respective CP 351-353. The CPs 351-353 all have the same CP duration 356.

The CP duration 356 is typically pre-configured by the BS 101 and semi-statically set. The CP duration 356 is typically set to be longer than the delay spread 380 expected for the various relevant channels 151 of the wireless link 111. Typically, the CP duration 356 is set to be significantly larger than the delay spread 380, to provide a certain headroom. This helps to increase robustness of the wireless communication.

Typically, the CP 351-353 is determined based on the associated OFDM symbol 361-363. For example, as illustrated in FIG. 3, the CP 351-353 can precede the OFDM symbol 361-363 and be determined based on an end of the OFDM symbol 361-363. The CP 351-353 can mirror the end of the waveform of the OFDM symbol 361-363. Thereby, the demodulation robustness can be increased. The CP 351-353, when received at the receiver, is typically discarded.

In the example of FIG. 3, all OFDM symbols 361-363 use the same frequency bandwidth. As a general rule, the multiple OFDM symbols 361-363 may at least be partially overlapping in frequency domain. Also, as illustrated in FIG. 3, each OFDM symbol 361-363 includes multiple subcarriers 340 that are spaced in frequency domain. Different subcarriers 340 can include different signals. For example, a first subcarrier 340 of the OFDM symbol 361 includes a reference signal 391 (dashed filling in FIG. 3) while a second subcarrier 340 of the OFDM symbol 361 includes a data signal 399 (checkerboard filling in FIG. 3). Different subcarriers 340 are orthogonal with respect to each other.

In FIG. 3, the OFDM symbols 362, 363—different from the OFDM symbol 361—do not include any data signals 399. The OFDM symbols 362, 363 include reference signals 392, 393, only.

For example, the purpose of the OFDM symbol 361 can be to (i) sound the channel 151 associated with the beam 501 and (ii) communicate the data encoded by the data signal 399. Differently, the purpose of the OFDM symbols 362, 363 can be limited to sounding the channels 151 associated with the beams 502, 503. In other words, it may not be required to communicate data using the OFDM symbols 362, 363.

According to some examples, it would be possible that the OFDM symbols 362, 363, on the subcarriers 340 not allocated to the reference signals 392, 393, do not contain any signals, i.e., do not emit power onto the wireless link 111. Thereby, inter-transmission interference between the transmissions 312, 313 and the transmission 311 can be reduced.

In the example of FIG. 3, the OFDM symbols 361-363 differ from each other. As a general rule, the reference signals 391-393 included in the various OFDM symbols 361-363 may or may not be different from each other. For example, in a simple implementation, the same OFDM symbol may be included in the multiple beam-swept transmissions 311-313. The OFDM symbol may include a given reference signal. This may reduce the processing complexity.

Where multiple OFDM symbols 361-363 are used, it is also possible to include different reference signals 391-393 in the multiple OFDM symbols 361-363. Referring to FIG. 3 in this context: In some examples, it would be possible that, e.g., the reference signal 391 is indicative of the beam 501 of the transmission 311 including the respective OFDM symbol 361; likewise, it would be possible that the reference signal 392 is indicative of the beam 502 of the transmission 312 including the respective OFDM symbol 362; and so on. For example, each reference signal 391-393 may be determined based on a base sequence that is pre-associated with the respective beam 501-503. In a scenario in which each reference signal 391-393 is indicative of the associated beam 501-503, it is possible to conclude back on the corresponding beam 501-503 at the receiver side, based on an analysis of the content of the reference signal 391-393.

As illustrated in FIG. 3, the transmissions 311-313 overlap in time. This allows to implement a short overall time required to transmit the reference signals 391-393 along all beams 501-503. In other words, the overall time duration 359 required to complete the beam-swept transmissions 311-313 can be small. This, in turn, allows to determine an appropriate beam 501-403 for a subsequent transmission 302 at low latency. The resources occupied by the beam-swept transmissions are limited.

Figure 4:
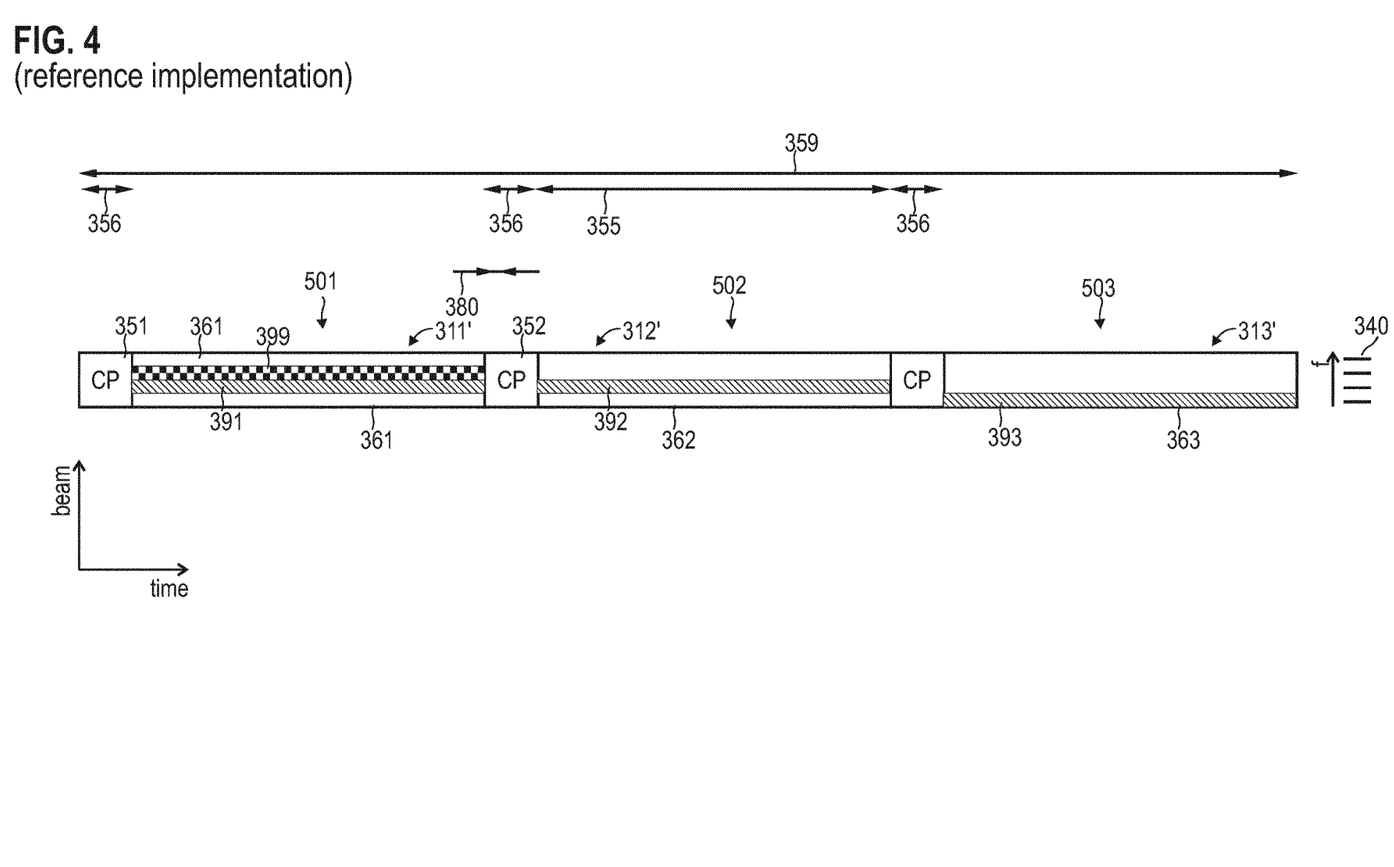
FIG. 4 schematically illustrates multiple beam-swept transmissions that are not overlapping in time domain according to reference implementations.

Specifically, advantages can be achieved if compared to reference implementations where a non-overlapping sequence of transmissions 311'-313' of the OFDM symbols 361-363 is used (cf. FIG. 4; where the further OFDM symbols 365, 366 are not illustrated).

For example, in the example of FIG. 3, the time duration 329 for the beam-sweeped transmissions 311-313 to complete is: $T_s+NT_{cp}$, where $T_s$ is the OFDM symbol duration 355 and $T_{cp}$ is the CP duration 356 and N is the count of beams 501-503, i.e., N=3. Differently, in the reference implementation of FIG. 4, the time duration for the beam-swept transmissions 311'-313' to complete is $N(T_s+T_{cp})$. Typically $T_{cp} \ll T_s$, e.g., $T_{cp}=T_s \times 0.01 \ldots 0.1$, i.e., the CP duration 356 is typically only a few percent of the OFDM symbol duration 355.

As illustrated in FIG. 3, the transmissions 311-313 have a time offset 381 from each other. The time offset 381 is dimensioned to be smaller than the CP duration 356.

By means of the time offset 381, it becomes possible to distinguish between the transmissions 311-313 at the receiver. Also, inter-transmission interference between the beam-swept transmissions 311-313 is mitigated.

For example, it is possible that the time offset 381 is dimensioned to be larger than the delay spread 380. This facilitates the separation of the reference signals 391-393 at the receiver. As a general rule, it would be possible that the time delay spread 380 is determined, e.g., using a further reference signal to sound the respective channel 151 of the wireless link. Then, based on the determined time delay spread, the time offset 381 can be determined.

In the example of FIG. 3, the time offset 381 between the transmission 311 and the transmission 312 is equal to the time offset 381 between the transmission 312 and the transmission 313. As a general rule, it would also be possible that different time offsets are employed between the various transmissions 311-313.

At the same time, interference between the beam-swept transmissions 311-313 and the adjacent further transmissions 301, 302 is typically to be avoided. For this, it is possible to avoid or reduce in overlap between the OFDM symbols 361-363 of the transmissions 311-313 with the OFDM symbols 365, 366 of the transmissions 301, 302. Specifically, for this, the time offset 381 between the various transmissions 311-313 can be compared with the CP duration 356. Then, a count of the multiple beam-swept transmissions 311-313/a count of the beams 501-503 can be determined based on this comparison. For example, the count of the multiple beam-swept transmissions 311-313 can be set such that the overlap between the OFDM symbols 361-363 of the beam-swept transmissions 311-313—at a given time offset 381—is below a threshold.

The CP duration 356 is set to be significantly larger than the time delay spread 380. Therefore, in some scenarios it can be possible to accommodate for a significant count of the beam-swept transmissions 311-313 using the default CP duration 356, therefore facilitating accurate and highly resolved sounding of the various channels 151 of the wireless link 111. Nonetheless, scenarios can occur where it is not possible to accommodate for a significantly large count of beam-swept transmissions 311-313 given the finite CP duration 356. To overcome this limitation, in some examples it is possible to temporarily prolong the CP duration 356. A corresponding scenario is illustrated in FIG. 5.

Figure 5:
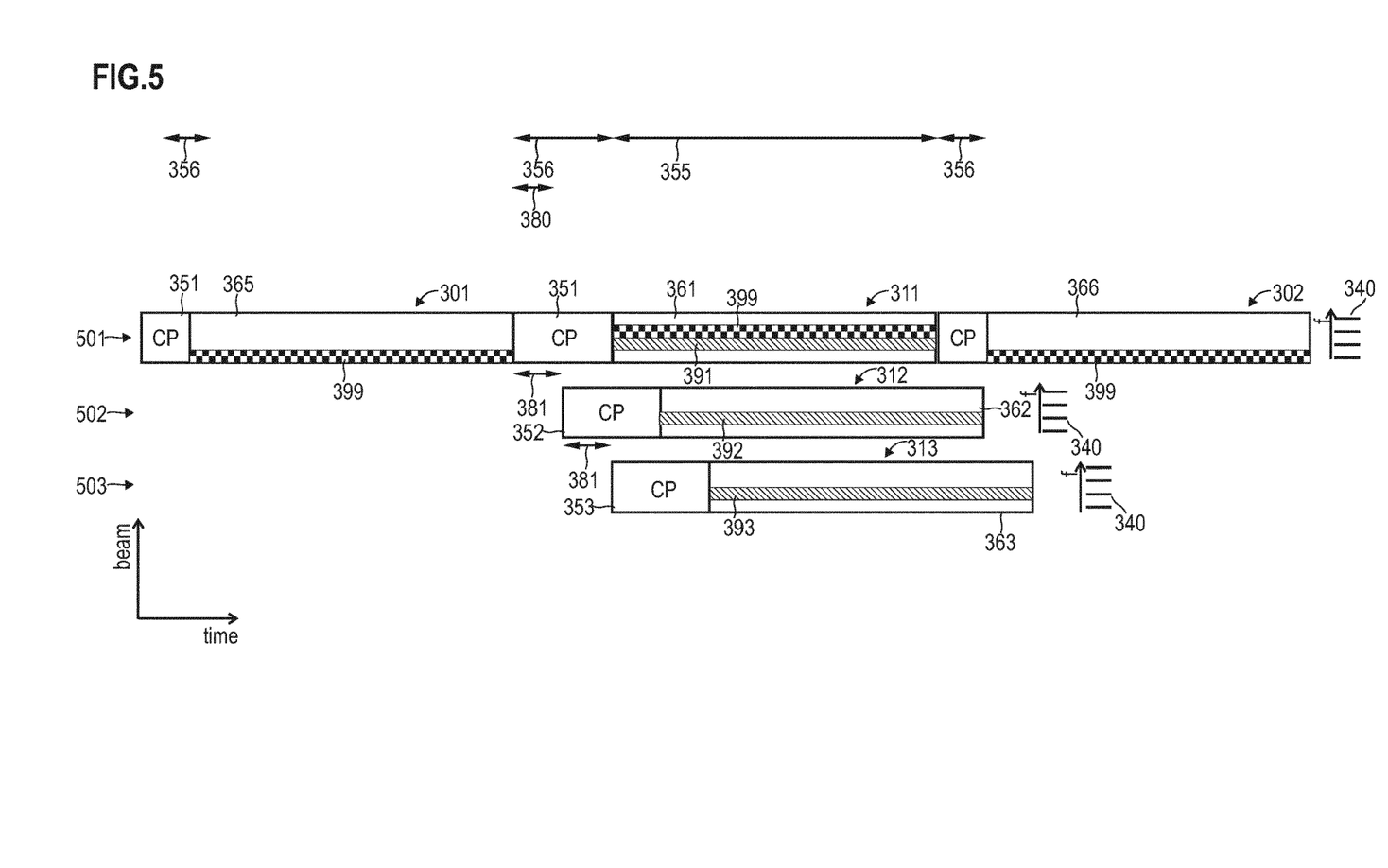
FIG. 5 schematically illustrates at multiple beam-swept transmissions that are at least partially overlapping in time domain and frequency domain according to various examples.

FIG. 5 illustrates aspects with respect to multiple beam-swept transmissions 311-313. The example of FIG. 5 generally corresponds to the example of FIG. 3. However, in the example of FIG. 5, the CP duration 356 associated with the OFDM symbols 361-363 of the beam-swept transmissions 311-313 are longer than the CP duration 356 associated with the further OFDM symbols 365, 366.

By temporarily prolonging the CP duration 356, there is a tendency that a larger count of beam-swept transmissions 311-313 can be implemented. Alternatively or additionally, by prolonging the CP duration 356, it is possible to implement a longer time offset 381—to thereby account for longer delay spreads 380 (from a comparison of FIGS. 3 and 5 it is apparent that in FIG. 5 the delay spread 380 is longer than in FIG. 3).

Thus, as a general rule, it is possible to determine the CP duration 356 based on at least one of the count of the beam-swept transmissions and the time offset 381.

The longer CP duration 356 may exclusively be applied to the OFDM symbols 361-363 of the beam-swept transmissions 311-313; i.e., other transmissions 301, 302—not used for sounding the channels 151—may use the shorter CP duration 356 (as illustrated in FIG. 5 for the OFDM symbols 365, 366).

In the example of FIG. 5, the time offset 381 is dimensioned to correspond to the CP duration 356 associated with the OFDM symbols 365, 366 of the adjacent transmissions 301, 302. This helps to set the time offset 381 to a significantly large value in view of the delay spread 380, because, typically, the CP duration 356 associated with the OFDM symbols 365, 366 is already dimensioned accordingly.

As will be appreciated from the above, there are various parameters that can be tuned in order to obtain a robust sounding of the various channels 151 associated with the beams 501-503. According to various examples, such and other parameters can be configured by the base station 101 or, more generally, can be synchronized and/or negotiated between the base station 101 and the UE 102. Corresponding techniques are illustrated in connection with FIG. 6.

Figure 6:
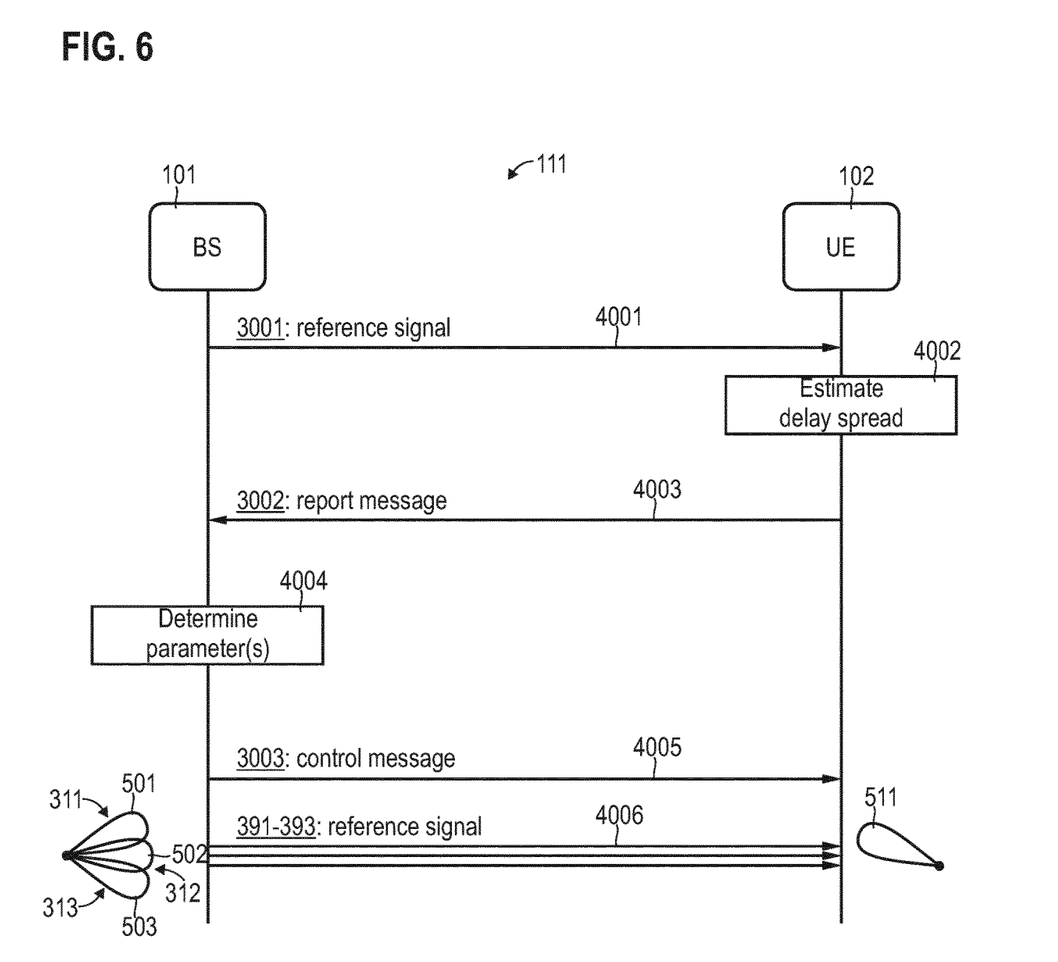
FIG. 6 is a signaling diagram of communication between the wireless communication devices of FIG. 1 according to various examples.

FIG. 6 illustrates aspects with respect to configuring the beam-swept transmissions 311-313. FIG. 6 is a signaling diagram of communicating on the wireless link 111.

Initially, at 4001, a DL reference signal 3001 is transmitted by the BS 101 and received by the UE 102. In some examples, it would be possible that the DL reference signal 3001 is transmitted undirected, i.e., not using a specific beam. In other examples (not illustrated in FIG. 6), one or beams 501-503 may be used for transmitting the DL reference signal 3001.

Next, at 4002, the UE 102 estimates the delay spread of one or more channels 151 of the wireless link 111. This is based on one more receive properties of the downlink reference signal 3001.

Next, the UE 102 transmits a report control message 3002, at 4003. The report control message 3002 is received by the BS 101. The report control message 3002 is indicative of the estimated delay spread 380. The BS 101 is thus informed on the delay spread 380.

Then, the BS 101 determines one or more beamsweep parameters, 4004. Examples of beamsweep parameters include the count of the beam-swept transmissions 311-313, the time offset(s) 381 between different ones of the beam-swept transmissions 311-313, and the CP duration 356 associated with the OFDM symbols 361-363 of the beam-swept transmissions 311-313. The one or more beamsweep parameters are determined based on the delay spread and, optionally, other decision criteria.

As a general rule, while in the example of FIG. 6 sounding of the one or more channels 151 of the wireless link 111 using the DL reference signal 3001 is illustrated, in other examples it would also be possible to alternatively or additionally sound the one or more channels using one or more UL reference signals.

Then, at 4005, a control message 3003 is communicated which is indicative of the determined one or more beam-sweep parameters. Thereby, the setting for the beam-sweep transmissions 311-313, performed at 4006, can be synchronized between the BS 101 and the UE 102.

At 4006, the BS 101 participates in the beam-swept transmissions 311-313 (cf. FIGS. 3 and 5) by transmitting one or more OFDM symbols 361-363 including on or more reference signals 391-393. The UE 102 participates in the beam-swept transmissions 311-313 by receiving the one or more OFDM symbols 361-363, using a receive beam 511.

Figure 7:
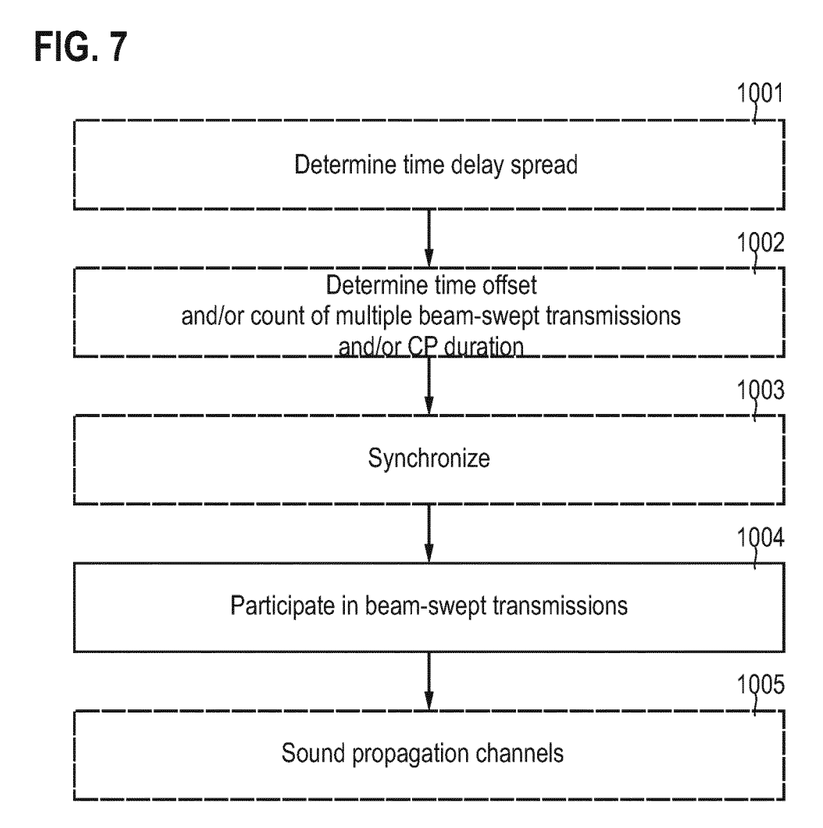
FIG. 7 is a flowchart of a method according to various examples.

FIG. 7 is a flowchart of a method according to various examples. For example, the method may be executed by the base station 101 and/or the UE 102.

At optional block 1001, the time delay spread of a wireless link between a first device and a second device is determined. For this, one or more of the following actions may be taken: (I) transmit a reference signal; (II) receive a reference signal; (III) determine a receive property of the reference signal; (IV) based on the received property, estimate the time delay spread; (V) transmit a report control message indicative of the estimated time delay spread; and (VI) extract the time delay spread from the report control message. An example implementation of the respective techniques has also been described above with respect to FIG. 6, 4001-4003.

Next, at optional block 1002, one or more parameters are determined. The one or more parameters can be selected from the group comprising: time offset; count of beam-sweeped transmissions; and/or CP duration. The one or more parameters may be determined based on the time delay spread and/or other decision criteria.

Then, the one or more parameters are synchronized between the first and second devices. This may include one or more of the following: (I) transmit a control message; and (II) receive the control message.

Next at block 1004, participation in multiple beam-swept transmissions is implemented. Block 1004 can include transmitting at least one OFDM symbol on multiple beams. Alternatively or additionally, block 1004 can include receiving the at least one OFDM symbol on one or more beams.

Then, at block 1005, multiple channels associated with the multiple beams of block 1004 are sounded. Block 1005 can include one or more of the following: (I) receiving one or more reference signals included in the at least one OFDM symbol; (II) determining one or more receive properties of the one or more reference signals; (III) determining a path loss or in other quality criteria on for the channels associated with the multiple beams; (IV) transmitting a feedback message indicative of the path loss or other quality criteria; and (V) receiving the feedback message.

It would be possible that subsequently one or more appropriate beams are selected based on the sounding of the multiple channels, for subsequent data communication.

Summarizing, techniques of implementing beam-swept transmissions have been illustrated. A reference scenario that can be used to benchmark the techniques described herein is illustrated in connection with FIGS. 8-10: these scenarios correspond to the reference implementation that has been described in connection with FIG. 4. Here, the transmissions 311', 312', 313' are sequentially implemented, i.e., one after another without an overlap.

Figure 8:
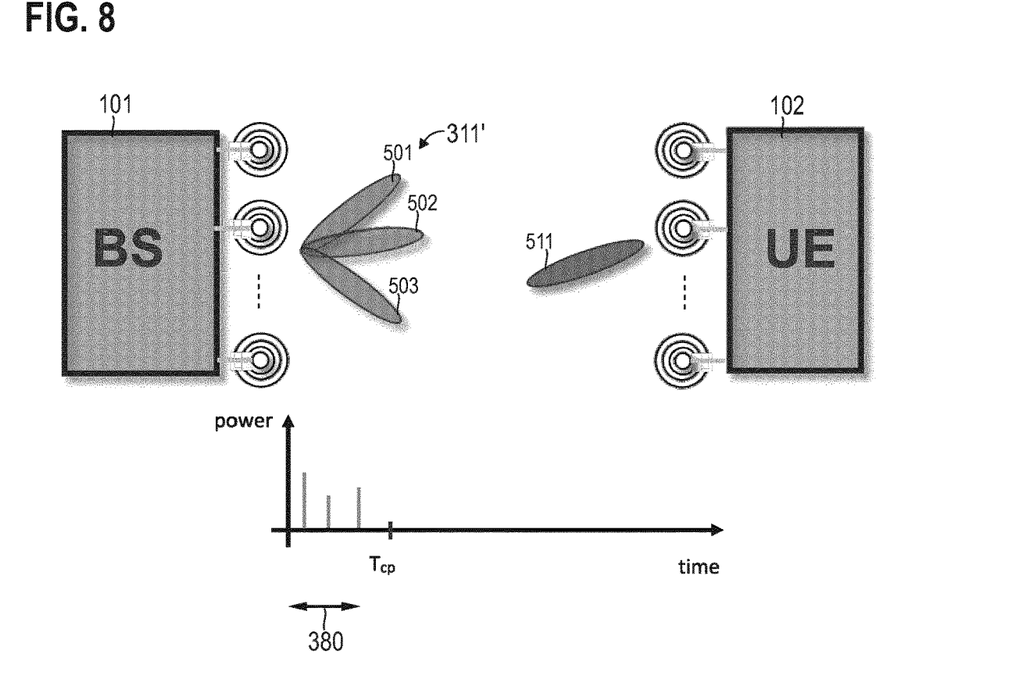
FIGS. 8, 9, and 10 schematically illustrate the non-overlapping beam-swept transmissions of FIG. 4 in further detail.
Figure 9:
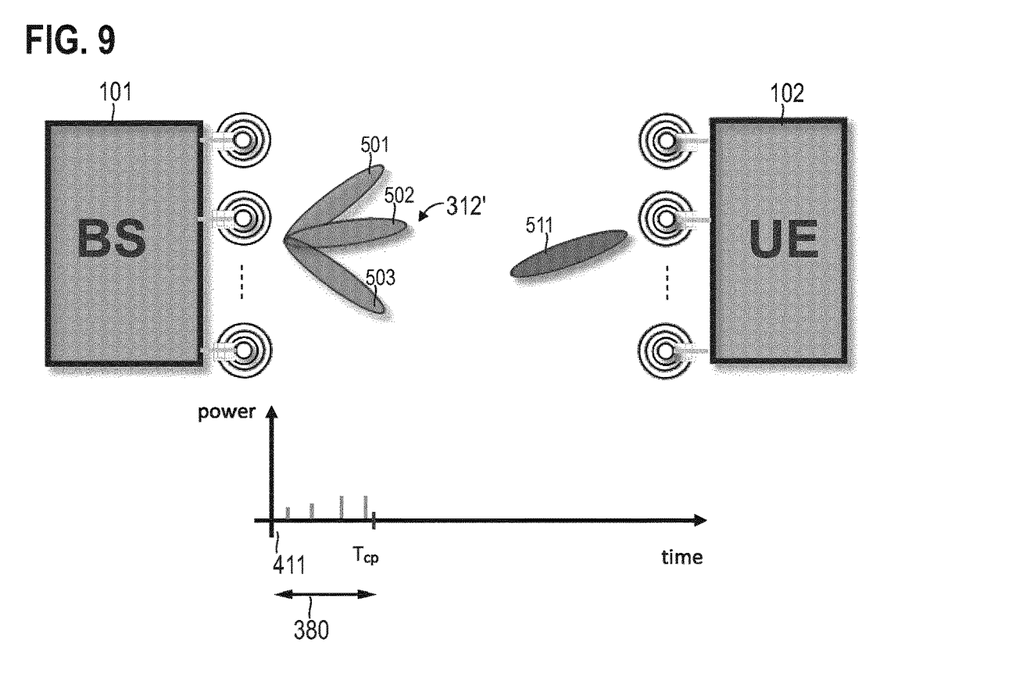
Figure 10:
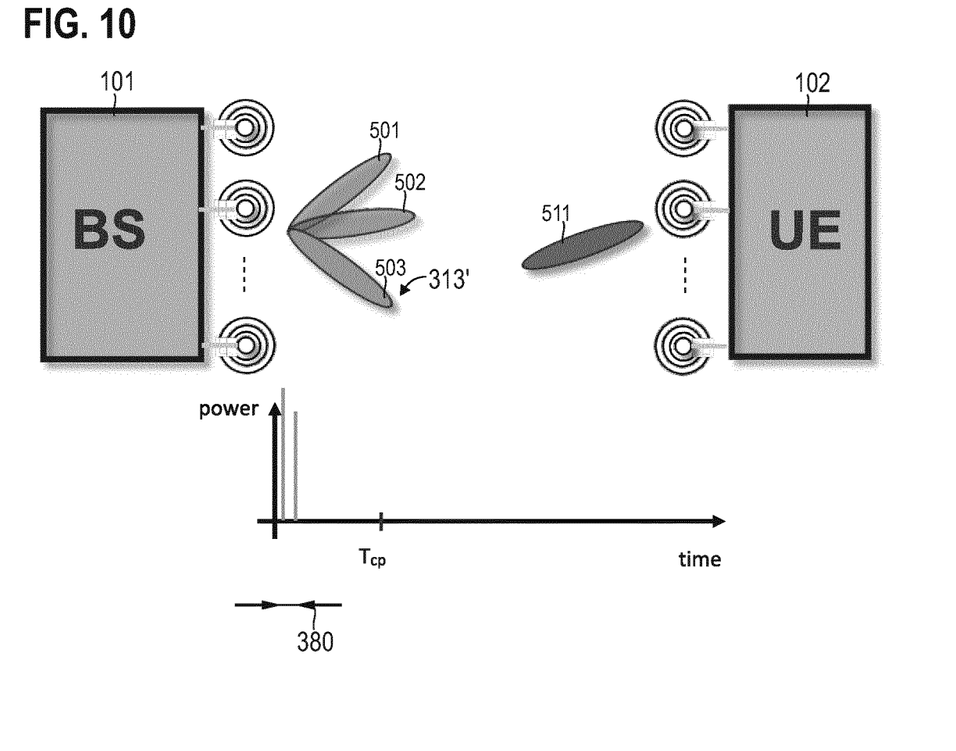

The lower parts of FIGS. 8-10 illustrates the estimated channel 151 associated with the respective one of the beam-swept transmissions 311'-313'. Here, the estimated delay spread 380 is derivable from the received power as a function of time. Also, the path loss can be determined. For example, the delay spread 380 of the channel 151 associated with the beam 502 is larger than the delay spread 380 of the channel 151 associated with the beam 501. Also, the path loss along the channel 151 associated with the beam 502 is larger than the path loss along the channel 151 associated with the beam 501, because less power arrives at the receiver along the channel 151 associated with the beam 502. The smallest delay spread 380 and path loss are achieved for the channel 151 associated with the beam 503.

Figure 11:
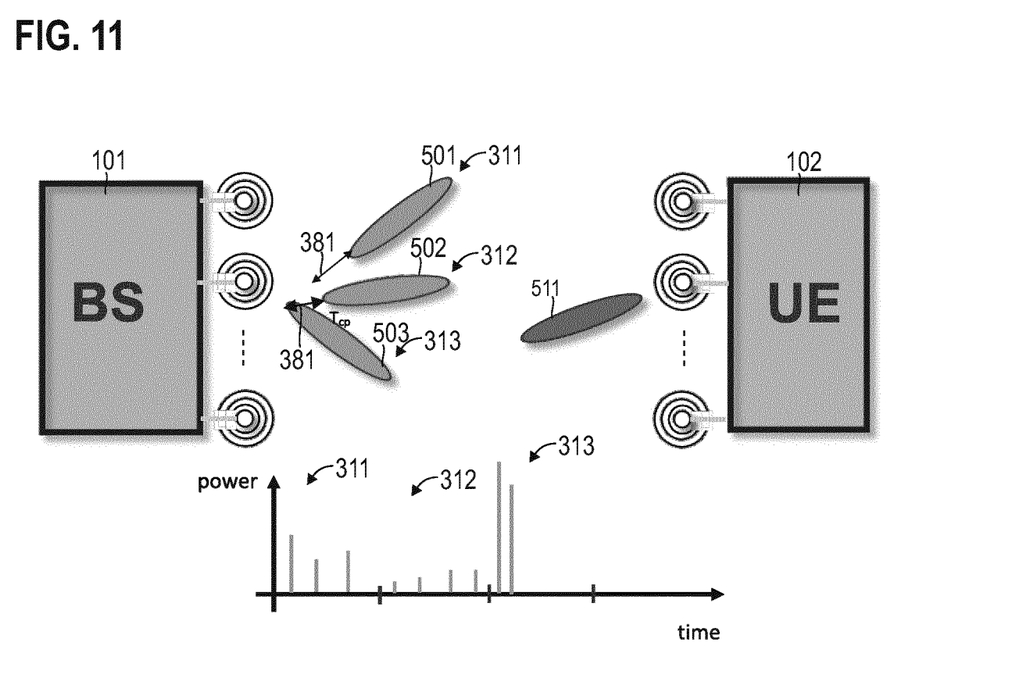
FIG. 11 schematically illustrates the multiple beam-swept transmissions of FIGS. 3 and 5 in further detail.

An implementation of the beam-swept transmissions 311-313 according to various examples is illustrated in FIG. 11. Here, the transmissions 311-313 are partially overlapping in time and frequency, and have time offsets 381. For example, the time offsets 381 can correspond to the CP duration of a further transmission preceding or succeeding the beam-swept transmissions 311-313. This can include temporarily prolonging the CP duration of the OFDM symbols of the beam-swept transmissions 311-313, e.g., to amount to an integer multiple of the CP duration of one or more further adjacent OFDM symbols. In an alternative implementation, the CP duration that is associated with the one or OFDM symbols of the beam-swept transmissions 311-313 may not be adjusted vis-à-vis the CP durations of one or more further OFDM symbols of adjacent transmissions; rather, the same, fixed CP duration may be used for the beam-swept transmissions 311-313 that is also used for adjacent transmissions. Then, it may still be possible to dimension the time offset 381 to be larger than the delay spread 380 of the wireless link 111; this is because, typically, the CP duration is dimensioned to include a certain headroom to provide for robust communication. This headroom can be used to accommodate for the multiple beam-swept transmissions 311-313.

As illustrated in the lower part of FIG. 11, due to the time offset 381, it is possible to distinguish—at the receiver, here the UE 102—between the transmissions 311-313. The transmissions 311-313 can be separated in time domain. For example, power per time unit can be estimated to sound the channels associated with the beam-swept transmissions 311-313. Then, based on the time-resolution of such a power per time unit estimation, it is possible to distinguish between the various transmissions 311-313 in time domain.

Also, above, various aspects have been described with respect to control signaling between the wireless communication devices—e.g., in the scenario of FIG. 11, the base station 101 and the UE 102—to synchronize one or more parameters associated with the beam-swept transmissions 311-313.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For illustration, various examples have been described above in which DL beam-swept transmissions are employed. Similar techniques may be readily employed for UL beam-swept transmissions or sidelink beam-swept transmissions.

For further illustration, various examples have been described in which OFDM symbols and associated CPs are employed. Similar techniques may be readily employed for other types of symbols and, generally, for GIs.

The invention claimed is:

1. A method of operating a wireless communication device, comprising:
    participating in beam-swept transmissions of at least one symbol on a wireless link between the wireless communication device and a further wireless communication device along multiple beams, each symbol of the at least one symbol including at least one reference signal, wherein the beam-swept transmissions are at least partly overlapping in frequency and time and have a time offset from each other that is smaller than a guard interval duration associated with the at least one symbol.

2. The method of claim 1, further comprising:
determining a time delay spread of the wireless link, and
determining the time offset based on the time delay spread.

3. The method of claim 1, further comprising:
determining a time delay spread of the wireless link, and
determining a count of the beam-swept transmissions based on a comparison between the time delay spread and the guard interval duration.

4. The method of claim 1, further comprising:
determining the guard interval duration based on at least one of a count of the beam-swept transmissions and the time offset.

5. The method of claim 1, further comprising:
communicating, on the wireless link, at least one control message indicative of at least one of a count of the multiple beams, the time offset, and the guard interval duration.

6. The method of claim 1, further comprising:
participate in, on the wireless link, at least one further transmission of at least one further symbol adjacent to the beam-swept transmissions,
wherein the at least one further symbol is associated with a further guard interval duration,
wherein the guard interval duration is longer than the further guard interval duration.

7. The method of claim 6,
wherein the time offset corresponds to the further guard interval duration.

8. The method of claim 1,
wherein a first symbol of the at least one symbol transmitted on a first beam of the multiple beams comprises, on one or more subcarriers, one or more data signals encoding data,
wherein at least one second symbol of the at least one symbol transmitted on at least one second beam of the multiple beams does not comprise, on the one or more subcarriers, the one or more data signals.

9. The method of claim 1,
wherein the at least one symbol comprises multiple symbols,
wherein each one of the multiple symbols comprises a respective reference signal of the at least one reference signal,
wherein the reference signals are indicative of a respective beam.

10. The method of claim 1, further comprising:
sounding multiple propagation channels of the wireless link associated with the multiple beams, by separating the beam-swept transmissions in time domain.

11. A wireless communication device, comprising:
an interface over which wireless communications with one or more other wireless communication devices are carried out; and
a processor configured to:
participate in beam-swept transmissions of at least one symbol on a wireless link between the wireless communication device and a further wireless communication device along multiple beams, each symbol of the at least one symbol including at least one reference signal,
wherein the beam-swept transmissions are at least partly overlapping in frequency and time and have a time offset from each other that is smaller than a guard interval duration associated with the at least one symbol.

* * * * *